(12) United States Patent
Chavez et al.

(10) Patent No.: US 9,201,568 B2
(45) Date of Patent: *Dec. 1, 2015

(54) THREE-DIMENSIONAL TRACKING OF A USER CONTROL DEVICE IN A VOLUME

(71) Applicant: zSpace, Inc., Sunnyvale, CA (US)

(72) Inventors: David A. Chavez, San Jose, CA (US); Milind Paranjpe, Mountain View, CA (US); Jerome C. Tu, Saratoga, CA (US)

(73) Assignee: zSpace, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/635,654

(22) Filed: Mar. 2, 2015

(65) Prior Publication Data
US 2015/0169173 A1 Jun. 18, 2015

Related U.S. Application Data

(63) Continuation of application No. 13/333,299, filed on Dec. 21, 2011, now Pat. No. 8,970,625.

(60) Provisional application No. 61/426,448, filed on Dec. 22, 2010.

(51) Int. Cl.
*G06T 15/00* (2011.01)
*G06T 17/00* (2006.01)
(Continued)

(52) U.S. Cl.
CPC ............ *G06F 3/04812* (2013.01); *G06F 3/012* (2013.01); *G06F 3/013* (2013.01); *G06F 3/0308* (2013.01); *G06F 3/038* (2013.01); *G06F 3/0346* (2013.01); *G06F 3/03545* (2013.01);
(Continued)

(58) Field of Classification Search
CPC combination set(s) only.
See application file for complete search history.

(56) References Cited

U.S. PATENT DOCUMENTS

| 3,983,474 A | 9/1976 | Kuipers |
| 4,945,305 A | 7/1990 | Blood |

(Continued)

FOREIGN PATENT DOCUMENTS

| JP | 2000102036 | 4/2000 |
| JP | 2000350860 | 12/2000 |

(Continued)

OTHER PUBLICATIONS

"PlayStation Move Teardown", iFixit—Licensed under Creative Commons BY_NC_SA 0.7269 seconds (Warthog)—Build 35, 2012, <http://www.ifixit.com/Teardown/PlayStation-Move-Teardown/3594/1>, 6 pages. [Retrieved Jan. 18, 2012].

(Continued)

*Primary Examiner* — Leon T Cain, II
(74) *Attorney, Agent, or Firm* — Meyertons Hood Kivlin Kowert & Goetzel, P.C.; Jeffrey C. Hood; Brian E. Moore

(57) ABSTRACT

Tracking objects presented within a stereo three-dimensional (3D) scene. The user control device may include one or more visually indicated points for at least one tracking sensor to track. The user control device may also include other position determining devices, for example, an accelerometer and/or gyroscope. Precise 3D coordinates of the stylus may be determined based on location information from the tracking sensor(s) and additional information from the other position determining devices. A stereo 3D scene may be updated to reflect the determined coordinates.

20 Claims, 5 Drawing Sheets

(51) Int. Cl.

| | | |
|---|---|---|
| *G06F 3/0481* | (2013.01) | |
| *G06F 3/01* | (2006.01) | |
| *G06F 3/03* | (2006.01) | |
| *G06F 3/038* | (2013.01) | |
| *H04N 13/00* | (2006.01) | |
| *H04N 13/04* | (2006.01) | |
| *G06F 3/0346* | (2013.01) | |
| *G06F 3/0354* | (2013.01) | |
| *G06F 3/046* | (2006.01) | |

(52) U.S. Cl.
CPC ............ *G06F3/046* (2013.01); *G06F 3/04815* (2013.01); *H04N 13/0011* (2013.01); *H04N 13/0468* (2013.01)

(56) References Cited

U.S. PATENT DOCUMENTS

| | | | |
|---|---|---|---|
| 5,742,394 | A | 4/1998 | Hansen |
| 6,246,231 | B1 | 6/2001 | Ashe |
| 6,417,839 | B1 | 7/2002 | Odell |
| 7,000,469 | B2 | 2/2006 | Foxlin |
| 7,161,686 | B2 | 1/2007 | Duling |
| 7,312,863 | B2 | 12/2007 | Feinsod |
| 8,287,373 | B2 | 10/2012 | Marks |
| 8,409,003 | B2 | 4/2013 | Ikeda |
| 8,625,854 | B2 | 1/2014 | Valkenburg |
| 8,942,780 | B2 | 1/2015 | Scully |
| 8,970,625 | B2 * | 3/2015 | Chavez et al. ............ 345/633 |
| 2010/0105475 | A1 | 4/2010 | Mikhailov |
| 2010/0123659 | A1 | 5/2010 | Beeman |

FOREIGN PATENT DOCUMENTS

| | | |
|---|---|---|
| JP | 2002082751 | 3/2002 |
| JP | 2005157610 | 6/2005 |

OTHER PUBLICATIONS

Ostrovsky, Gene; "Kinect 3D Gaming Camera Used to Control da Vinci Surgical Robot;" medGadget, <http://medgadget.com/2011/02/kinect_3d_gaming_camera_used_to_control_da_vinci_surgical_robot.html> (created Feb. 10, 2011), retrieved Nov. 30, 2012; pp. 1-2.

Yin-Poole, Wesley; "Kinect 2 so accurate it can lip read," EuroGamer.net, Nov. 28, 2011, <http://www.eurogamer.net/articles/2011-11-25-kinect-2-so-accurate-it-can-lip-read>, 2 pages. [Retrieved Jan. 18, 2012].

"Motion Tracking: Virtual Reality13 Education", Polhemus—Innovation in Motion, <http://polhemus_com/?page=Motion_Applications_VR_Edu>, 2 pages. [Retrieved Jan. 18, 2012].

"Motion Tracking: PATRIOT™ Digitizer", Polhemus—Innovation in Motion, <http://polhemus.com/?page=Motion_PATRIOT%20Digitizer>, 2 pages. [Retrieved Jan. 18, 2012].

"Virtual Reality—Education;" Polhemus Motion Tracking, <http://polhemus.com/?page=Motion_Applications_VR_Edu>, retrieved Nov. 30, 2012; pp. 1-2.

"PATRIOT Digitizer;" Polhemus Motion Tracking, <http://polhemus.com/?page=Motion_PATRIOT%20Digitizer>, retrieved Nov. 30, 2012; pp. 1-2.

International Search Report for Application No. PCT/US2011/066519, mailed Sep. 3, 2012; 12 pages.

\* cited by examiner

1

THREE-DIMENSIONAL TRACKING OF A USER CONTROL DEVICE IN A VOLUME

PRIORITY INFORMATION

This application is a continuation of U.S. patent application Ser. No. 13/333,299 entitled "Three-Dimensional Tracking of a User Control Device in a Volume" by David Chavez, Milind Paranjpe, Jerome C. Tu filed Dec. 21, 2011 which claims benefit of priority of U.S. Provisional Application Ser. No. 61/426,448 entitled "Three-Dimensional Tracking of Objects in a 3-D Scene" by David Chavez, Milind Paranjpe, Jerry Tu, and Michael Cheponis, filed Dec. 22, 2010, the each of which is hereby incorporated by reference in its entirety as though fully and completely set forth herein.

INCORPORATION BY REFERENCE

The following references are hereby incorporated by reference in their entirety as though fully and completely set forth herein:

U.S. patent application Ser. No. 11/098,681 (U.S. Patent Publication No. 2005/0219694), titled "Horizontal Perspective Display", filed on Apr. 4, 2005.

U.S. patent application Ser. No. 11/141,649 (U.S. Patent Publication No. 2005/0264858), titled "Multi-plane Horizontal Perspective Display", filed on May 31, 2005.

U.S. patent application Ser. No. 17/797,958, titled "Presenting a View within a Three Dimensional Scene", filed on Jun. 10, 2010.

TECHNICAL FIELD

This disclosure relates to the field of spatial tracking, and more particularly three-dimensional tracking.

DESCRIPTION OF THE RELATED ART

Systems that track a user's movement provide the ability to interact virtually with another environment, such as a gaming environment. However, current systems are limited in their capabilities. For example, gross movement may be tracked, but for slow or constant velocity movements, the current systems lack precision. In other systems, two dimensions may be tracked accurately while a third dimension is not. Still other systems may be prone to interference from magnetic devices and may not be able to consistently identify true north. Finally, some systems utilize a large form factor enclosure that may not allow precise movement control.

SUMMARY OF EMBODIMENTS

Embodiments relate to tracking objects presented within a three-dimensional (3D) scene. In one embodiment, a system includes a display configured to display the 3D scene. The system may include a user control device configured to manipulate objects within the 3D scene. The user control device (e.g., stylus) may include at least one visually indicated point. In one embodiment, at least one tracking sensor (e.g., camera) may be configured to capture the visually indicated point of the user control device. A processing subsystem may be configured to receive the captured visually indicated point from the tracking sensor and may also be configured to receive additional information from the user control device (e.g., measurement information from an accelerometer, gyroscope, magnetometer, etc.). The processing subsystem may be further configured to determine a position and orientation of the user control device based on the captured visually indicated point and the additional information. The processing subsystem may also be configured to provide an updated 3D scene to the display based on the determined position and orientation of the user control device. The updated 3D scene may reflect accuracy between the physical space of the user control device to the graphic space of the 3D scene to within 1 mm of each of the x, y, and z axes.

BRIEF DESCRIPTION OF THE DRAWINGS

A better understanding of the present disclosure can be obtained when the following detailed description of the preferred embodiment is considered in conjunction with the following drawings, in which.

Figure 1:
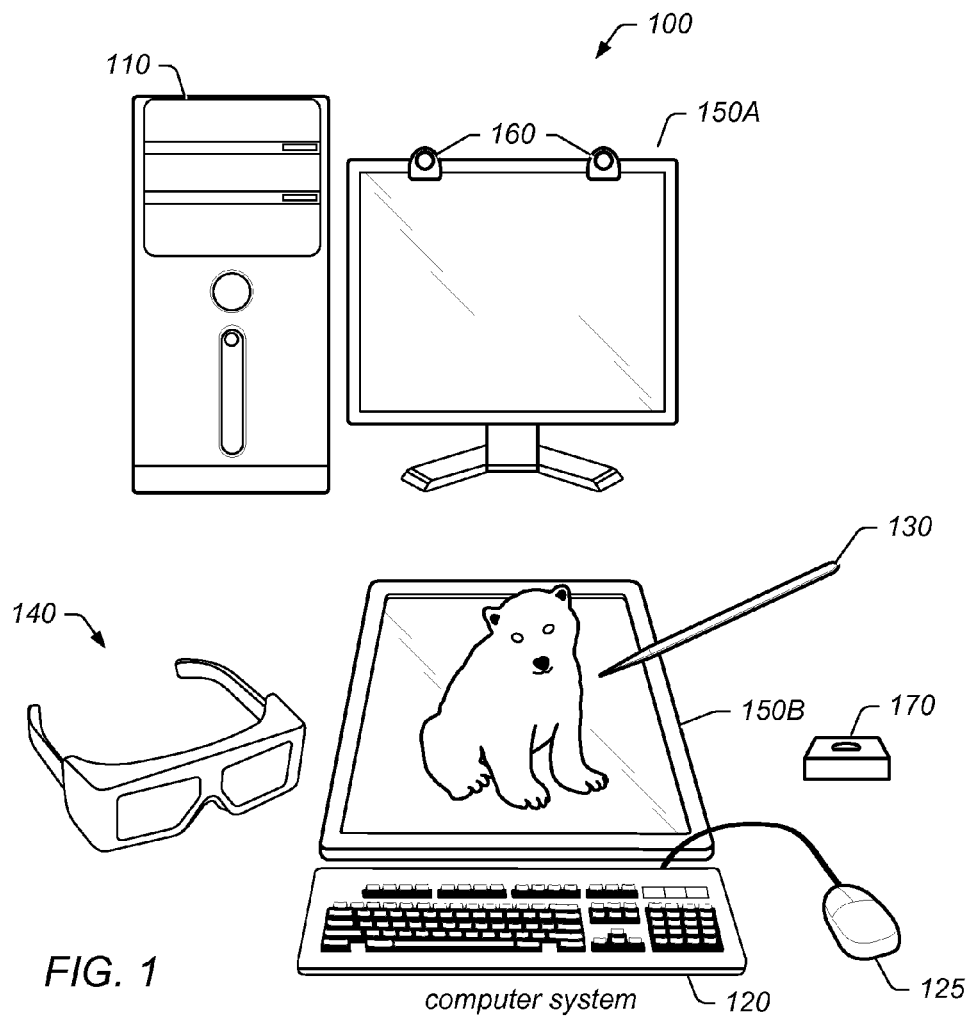
FIGS. 1 and 2 illustrate exemplary systems configured to implement various embodiments.

While the disclosure is susceptible to various modifications and alternative forms, specific embodiments thereof are shown by way of example in the drawings and are herein described in detail. It should be understood, however, that the drawings and detailed description thereto are not intended to limit the disclosure to the particular form disclosed, but on the contrary, the intention is to cover all modifications, equivalents and alternatives falling within the spirit and scope of the present disclosure as defined by the appended claims.

DETAILED DESCRIPTION

Terms

The following is a glossary of terms used in the present application:

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Memory Medium—any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of memory as well or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as a physical transmission medium, such as a bus, network, and/or other physical transmission medium that conveys signals such as electrical, electromagnetic, or digital signals.

Computer System—any of various types of computing or processing systems, including a personal computer system (PC), mainframe computer system, workstation, network appliance, Internet appliance, personal digital assistant (PDA), smart phone, television system, grid computing system, or other device or combinations of devices. In general, the term "computer system" can be broadly defined to encompass any device (or combination of devices) having at least one processor that executes instructions from a memory medium.

Viewpoint—this term has the full extent of its ordinary meaning in the field of computer graphics/cameras. For example, the term "viewpoint" may refer to a single point of view (e.g., for a single eye) or a pair of points of view (e.g., for a pair of eyes). Thus, viewpoint may refer to the view from a single eye, or may refer to the two points of view from a pair of eyes. A "single viewpoint" may specify that the viewpoint refers to only a single point of view and a "paired viewpoint" or "stereoscopic viewpoint" may specify that the viewpoint refers to two points of view (and not one). Where the viewpoint is that of a user, this viewpoint may be referred to as an eyepoint (see below). The term "virtual viewpoint" refers to a viewpoint from within a virtual representation or 3D scene.

Eyepoint—the physical viewpoint of a single eye or a pair of eyes. A viewpoint above may correspond to the eyepoint of a person. For example, a person's eyepoint has a corresponding viewpoint.

Vertical Perspective—a perspective which is rendered for a viewpoint which is substantially perpendicular to the display surface. "Substantially perpendicular" may refer to 90 degrees or variations thereof, such as 89 and 91 degrees, 85-95 degrees, or any variation which does not cause noticeable distortion of the rendered scene. A vertical perspective may be a central perspective, e.g., having a single (and central) vanishing point. As used herein, a vertical perspective may apply to a single image or a stereoscopic image. When used with respect to a stereoscopic image (e.g., presenting a stereoscopic image according to a vertical perspective), each image of the stereoscopic image may be presented according to the vertical perspective, but with differing single viewpoints.

Horizontal Perspective—a perspective which is rendered from a viewpoint which is not perpendicular to the display surface. More particularly, the term "horizontal perspective" refers to a perspective which is rendered using a substantially 45 degree angled render plane in reference to the corresponding viewpoint. The rendering may be intended for a display which may be positioned horizontally (e.g., parallel to a table surface or floor) in reference to a standing viewpoint perspective. "Substantially 45 degrees" may refer to 45 degrees or variations thereof, such as 44 and 46 degrees, 40-50 degrees, or any variation which may cause minimal distortion of the rendered scene. As used herein, a horizontal perspective may apply to a single image or a stereoscopic image. When used with respect to a stereoscopic image (e.g., presenting a stereoscopic image according to a horizontal perspective), each image of the stereoscopic image may be presented according to the horizontal perspective, but with differing single viewpoints.

Position—the location or coordinates of an object (either virtual or real). For example, position may include x, y, and z coordinates within a defined space. The position may be relative or absolute, as desired. Position may also include yaw, pitch, and roll information, e.g., when defining the orientation of a viewpoint.

Comprising—this term is open-ended. As used in the appended claims, this term does not foreclose additional structure or steps. Consider a claim that recites: "A system comprising a display . . . ." Such a claim does not foreclose the apparatus from including additional components (e.g., a voltage source, a light source, etc.).

Configured To—various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue.

First, Second, etc.—these terms are used as labels for nouns that they precede, and do not imply any type of ordering (e.g., spatial, temporal, logical, etc.). For example, in a system having multiple tracking sensors, the terms "first" and "second" sensors may be used to refer to any two sensors. In other words, the "first" and "second" sensors are not limited to logical sensors 0 and 1.

Based On—this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

Figure 2:
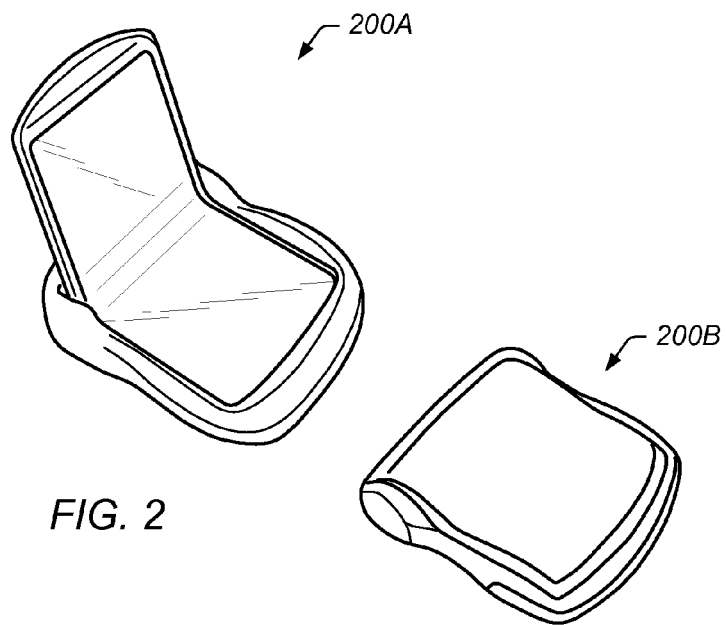

FIGS. 1 and 2—Exemplary Systems

FIGS. 1 and 2 illustrate exemplary systems which are configured to perform various embodiments described below.

In the embodiment of FIG. 1, computer system 100 may include chassis 110, display 150A and display 150B (which may collectively be referred to as display 150 or "at least one display" 150), keyboard 120, mouse 125, stylus 130, eyewear 140, at least two cameras 160, and stylus caddy 170. In one embodiment, at least one of the displays 150A and 150B is a stereoscopic display. For example, in one embodiment, both of the displays 150A and 150B are stereoscopic displays.

The chassis 110 may include various computer components such as processors, memory mediums (e.g., RAM, ROM, hard drives, etc.), graphics circuitry, audio circuitry, and other circuitry for performing computer tasks, such as those described herein. A memory medium may store one or more computer programs or software components according to various embodiments of the present disclosure. For example, the memory medium may store one or more graphics engines which are executable to perform the methods described herein. The memory medium may also store data (e.g., a computer model) representing a virtual/graphic space, which may be used for projecting a 3D scene of the virtual space via the display(s) 150. Further, the memory medium may store software which is executable to perform three-dimensional spatial tracking of stylus 130, as described herein. Additionally, the memory medium may store operating system software, as well as other software for operation of the computer system. Various embodiments further include receiving or storing instructions and/or data implemented in accordance with the foregoing description upon a carrier medium.

As indicated above, the computer system 100 may be configured to display a three-dimensional (3D) scene (e.g., via stereoscopic images) using the display 150A and/or the display 150B. The computer system 100 may also be configured to display a "view" of the 3D scene using the display 150A, the display 150B, and/or another display, as described in more detail below. The "view" of the 3D scene may refer to displaying a portion of the 3D scene from a viewpoint within the 3D scene. A viewpoint within the 3D scene may be referred to as a "virtual viewpoint". The view may be stereoscopic, e.g., may be displayed on a stereoscopic display. Alternatively, the view may be monoscopic (not stereoscopic), and may be displayed on either a monoscopic display or a stereoscopic display.

It should be noted that the embodiment of FIG. 1 is exemplary only, and other numbers of displays are envisioned. For example, the computer system 100 may include only a single display or more than two displays, or the displays may be arranged in different manners than shown. In this particular embodiment, the display 150A is configured as a vertical display (which is perpendicular to a user's line of sight) and the display 150B is configured as a horizontal display (which is parallel or oblique to a user's line of sight). The vertical display 150A may be used (e.g., via instructions sent by a graphics engine executing in the chassis 110) to provide images which are presented according to a vertical (or central) perspective and the display 150B may be used (e.g., via instructions sent by a graphics engine executing in the chassis 110) to provide images which are presented according to a horizontal perspective. Descriptions of horizontal and vertical perspectives are provided herein. Additionally, while the displays 150 are shown as flat panel displays, they may be any type of system which is capable of displaying images, e.g., projection systems.

Either or both of the displays 150A and 150B may present (display) stereoscopic images for viewing by the user. By presenting stereoscopic images, the display(s) 150 may present a 3D scene for the user. This 3D scene may be referred to as an illusion since the actual provided images are 2D, but the scene is conveyed in 3D via the user's interpretation of the provided images. In order to properly view the stereoscopic images (one for each eye), the user may wear eyewear 140. The eyewear 140 may be anaglyph glasses, polarized glasses, shuttering glasses, lenticular glasses, etc. Using anaglyph glasses, images for a first eye are presented according to a first color (and the corresponding lens has a corresponding color filter) and images for a second eye are projected according to a second color (and the corresponding lens has a corresponding color filter). With polarized glasses, images are presented for each eye using orthogonal polarizations, and each lens has the corresponding orthogonal polarization for receiving the corresponding image. With shuttering glasses, each lens is synchronized to alternations of left and right eye images provided by the display(s) 150. The display may provide both polarizations simultaneously or in an alternating manner (e.g., sequentially), as desired. Thus, the left eye is allowed to only see left eye images during the left eye image display time and the right eye is allowed to only see right eye images during the right eye image display time. With lenticular glasses, images form on cylindrical lens elements or a two dimensional array of lens elements. The stereoscopic image may be provided via optical methods, where left and right eye images are provided only to the corresponding eyes using optical means such as prisms, mirror, lens, and the like. Large convex or concave lenses can also be used to receive two separately projected images to the user.

In one embodiment, the eyewear 140 may be used as a position input device to track the eyepoint of a user viewing a 3D scene presented by the system 100. For example, the eyewear 140 may provide information that is usable to determine the position of the eyepoint(s) of the user, e.g., via triangulation. The position input device can include an infrared detection system to detect the position the viewer's head to allow the viewer freedom of head movement or use a light sensitive detection system. Other embodiments of the input device can be the triangulation method of detecting the viewer eyepoint location, such as at least two sensors (e.g., at least two CCD cameras) providing position data suitable for the head tracking objectives of the disclosure. The input device can be manually operated by the viewer, such as a keyboard, mouse, trackball, joystick, or the like, to indicate the correct display of the horizontal perspective display images. However, any method for tracking the position of the user's head or eyepoint is envisioned. Accordingly, the 3D scene may be rendered such that user can view the 3D scene with minimal distortions (e.g., since it is based on the eyepoint of the user). Thus, the 3D scene may be particularly rendered for the eyepoint of the user, using the position input device. In some embodiments, each eyepoint may be determined separately, or a single eyepoint may be determined and an offset may be used to determine the other eyepoint.

The relationship among the position/orientation of the display(s) 150 and the eye(s) position of the user may be used to map a portion of the virtual/graphic space to the physical space of the system 100. In essence, the physical space and components used are to be mapped to the virtual model in order to accurately render a 3D scene of the virtual space. Examples for implementing such a system are described in the incorporated-by-reference U.S. patent application Ser. No. 11/098,681 entitled "Horizontal Perspective Display" (U.S. Patent Publication No. US 2005/0219694).

One or more of the user input devices (e.g., the keyboard 120, the mouse 125, the stylus 130, etc.) may be used to interact with the presented 3D scene, such as by manipulating objects in the graphic space of the 3D scene. For example, user control device 130 (shown as a stylus) or simply the user's hands may be used to directly interact with virtual objects of the 3D scene (via the viewed projected objects). However, this direct interaction may only be possible with "open space" portions of the 3D scene. Thus, at least a portion of the 3D scene may be presented in this "open space", which is in front of or otherwise outside of the at least one display. In some embodiments, that portion of the 3D scene may appear as a hologram above the surface of the display 150. For example, when the horizontal display 150B is used, the 3D scene may be seen as hovering above the horizontal display. It should be noted however, that a portion of the 3D scene may also be presented as appearing behind the display surface, which is not in "open space". Thus, "open space" refers to a space which the user is able to freely move and interact with (e.g., where the user is able to place his hands in the space) rather than a space the user cannot freely move and interact with (e.g., where the user is not able to place his hands in the space, such as below the display surface). This "open space"

may be referred to as a "hands-on volume" as opposed to an "inner-volume", which may be under the surface of the display(s). Thus, the user can interact with virtual objects in the open space because they are proximate to the user's own physical space. The inner volume is located behind the viewing surface and presented objects appear inside the physically viewing device. Thus, objects of the 3D scene presented within the inner volume do not share the same physical space with the user and the objects therefore cannot be directly, physically manipulated by hands or hand-held tools such as stylus 130. That is, they may be manipulated indirectly, e.g., via a computer mouse, a joystick, or virtual representations of hands, handheld tools, or styluses.

In some embodiments, this open space interaction may be achieved by having a 1:1 correspondence between the virtual objects (e.g., in the virtual/graphic space) and projected objects (e.g., in the physical space). Thus, an accurate and tangible physical interaction is provided by allowing a user to touch and manipulate projected objects with his hands or hand held tools, such as the stylus 130. This 1:1 correspondence of the virtual elements and their physical real-world equivalents is described in more detail in U.S. Patent Publication No. 2005/0264858, which was incorporated by reference in its entirety above. This 1:1 correspondence may allow the user to physically and directly access and interact with projected objects of the 3D scene. This 1:1 correspondence may utilize the creation of a common physical reference plane, as well as, the formula for deriving its unique x, y, z spatial coordinates, thereby correlating the physical coordinate environment to the virtual coordinate environment. Additionally, the 1:1 correspondence allows the user's movement of virtual objects or other interaction (e.g., via the stylus 130) to be the same in physical space and in presented space. However, other embodiments are envisioned where there is a ratio between the distance of the user's physical movement and the corresponding movement in the presented 3D scene (e.g., of the presented object or virtual stylus).

As used herein, an object within a stereo 3D context may be something that is visible or exhibits some tangible form in a relatively stable manner. One example of an object could be a representation of an apple. The apple, as a computer model, could exist as data in a most basic state, taking on various qualities of a 3D object as modeled within a graphic space. This apple object could then be rendered graphically from within the computer's graphic space, based on the viewpoint of the user as translated to the graphic space. The object may have shape and visual texture; however, it may not be necessary for the object to have mass to be an object. It can exist as an image in a virtual environment, and may be the result of a stereo rendering that captures two renderings (e.g., left and right viewpoints) from the identified viewpoint within the graphic space. These two renderings of the object (and any scene aspects within the render view of the graphic space) may be conveyed using a stereo display system. In one embodiment, the graphic space apple object may have no real mass and may not be sensed as an object of substance; however, it can be indirectly handled or manipulated. Handling or manipulating can be accomplished through the combination of the stereo rendering providing visual context and a way to manipulate using spatial position recognition with, for example, a hand-held manipulating device (e.g., stylus).

Manipulate may be used herein to describe handling, managing, or otherwise using in some process. In the context of a virtual object projected and viewing using a stereo device, the manipulation may be purely virtual. Therefore, in some embodiments, an object may not necessarily be physically touched to manipulate it. A correlation may exist between the physical space, where a physical manipulator (e.g., stylus) is used, and the graphic space where the object to be manipulated is represented. An object may be manipulated indirectly using one or more manipulating devices, such as a glove or stylus. Examples of manipulating an object may include picking it up, rotating it in any direction, moving it forward or backward, deconstructing it, etc. Such actions may be performed indirectly via usage of the hand-help manipulating device. Using the stereo rendering of the graphics object that may be presented for a user to view via a stereo display device, a faux spatial space may be created and may be viewed. A user may position the manipulating device within the spatial space in a position coincident with the view of the stereo rendered object. The position may be tracked and may have a 1:1 correspondence to the graphic space. With the 1:1 correspondence of the manipulating device in the physical spatial space to the graphic space, a spatial correlation may be established. The coincident object within the graphic space may then be manipulated. As such, the actions of the manipulating device in the spatial space may apply to a virtual object in the graphic space. Manipulation may allow the object to be positioned, oriented, altered, or affected as if the object actually was within the spatial space and acted upon by the manipulating device. Manipulating an object may be used herein to mean virtually handling an object that is in a graphically rendered state and that may be viewed using a stereo display. The interpretation of the object may occur in software where logic may control the interaction of data (e.g., object data, stylus tracking data, etc.). The software may then instruct the scene renderer to render left and right eye images of the scene containing object(s) showing the effect the manipulation had on the object(s). Although much of the description describes manipulating an object, more than one object may be manipulated and/or rendered simultaneously.

In some embodiments, system 100 may include one or more tracking sensors (e.g., cameras) 160, and in some embodiments two or more cameras 160. FIG. 1 illustrates an embodiment using two cameras 160. Cameras 160 may be used to image a user of system 100, track a user's movement, or track a user's head or eyes. In one embodiment, cameras 160 may track a position and an orientation of stylus 130. The information regarding the position and/or orientation of the stylus 130 provided by the two or more cameras 160 may be used in conjunction with other additional information of the system (e.g., an accelerometer and/or gyroscope within the stylus itself) to perform more precise three dimensional tracking of the stylus 130. Cameras 160 may be spatially separated from one another and placed in a position to view a volume that encompasses where a user will view stereo imagery. For instance, each camera may be positioned relative to a predefined position and orientation of one or more of displays 150 (e.g., as shown in FIG. 1, each camera may be embedded in display 150B at a predefined position and orientation). Cameras 160 may also be far enough apart from each other to provide for a separation of view for a true three-axis triangulation determination. System 100 may also include a caddy 170 to store stylus 130. As discussed below, caddy 170 may also be used to calibrate the orientation of the stylus to a known roll, pitch, and yaw. Caddy 170 may be in a fixed position relative to cameras 160.

In various embodiments, tracking sensor(s) 160 may sense a visually indicated point of user control device 130. For example, a single tracking sensor may include a single sensor with multiple light fiber bundles, with each fiber bundle capturing a distinct view (perspective) such that multiple images of the visually indicated point may be captured with each image having a distinct perspective of the visually indicated point. As another example, a single sensor may capture multiple distinct perspectives by capturing the visually indicated point at slightly different times. Still in other examples, more than one tracking sensors may be used to capture the multiple distinct perspectives of the visually indicated point.

As described below, the user may be able to specify or otherwise manipulate a virtual viewpoint within the 3D scene presented by the display(s) 150. A view of the 3D scene may be presented based on the virtual viewpoint, either by one or more of the display(s) 150 or another display, as desired. This view of the 3D scene may be stereoscopic or monoscopic, as desired. More details regarding the view of the 3D scene are provided below.

The 3D scene generator stored and executed in the chassis 110 may be configured to dynamically change the displayed images provided by the display(s) 150. More particularly, the 3D scene generator may update the displayed 3D scene based on changes in the user's eyepoint, manipulations via the user input devices, etc. Such changes may be performed dynamically, at run-time. The 3D scene generator may also keep track of peripheral devices (e.g., the stylus 130 or the eyewear 140) to ensure synchronization between the peripheral device and the displayed image. The system can further include a calibration unit to ensure the proper mapping of the peripheral device to the display images and proper mapping between the projected images and the virtual images stored in the memory of the chassis 110.

In further embodiments, the system 100 (e.g., the display(s) 150) can further comprise an image enlargement/reduction input device, an image rotation input device, and/or an image movement device to allow the viewer to adjust the view of the projection images.

Thus, the system 100 may present a 3D scene which the user can interact with in real time. The system may comprise real time electronic display(s) 150 that can present or convey perspective images in the open space and a peripheral device 130 that may allow the user to interact with the 3D scene with hand controlled or hand-held tools. The system 100 may also allow the displayed image to be magnified, zoomed, rotated, and moved. Or, system 100 may even display a new image.

Further, while the system 100 is shown as including horizontal display 150B since it simulates the user's visual experience with the horizontal ground, any viewing surface could offer similar 3D illusion experience. For example, the 3D scene can appear to be hanging from a ceiling by projecting the horizontal perspective images onto a ceiling surface, or appear to be floating from a wall by projecting horizontal perspective images onto a vertical wall surface. Moreover, any variation in display orientation and perspective (or any other configuration of the system 100) are contemplated.

FIG. 2 illustrates another embodiment of the system 100, shown as 200A and 200B. In this embodiment, the system may be a foldable and/or portable system (e.g., similar to a laptop or tablet computer) where the user may have the system 200 open (as shown in 200A) or closed (as shown in 200B). In this embodiment, the horizontal display and vertical display may be blended by a blending display. Thus, the display of the system 200 may be thought of as a plurality of combined displays, or a single display which is able to project horizontally and/or vertically, as desired.

Exemplary Systems

Embodiments of the current disclosure may enable precise stylus tracking and mapping from a graphic space to a display space. The disclosed embodiments may enable real-time computer-generated 3D simulations to coexist in physical space and time with the user interacting with the projected objects of the graphic space. The disclosed embodiments may also enable a user to better interact with non-projected objects. This improved ability may be useful in many industries including, but not limited to, electronics, computers, biometrics, medical, education, games, movies, science, legal, financial, communication, law enforcement, national security, military, print media, television, advertising, trade show, data visualization, computer-generated reality, animation, CAD/CAE/CAM, productivity software, operating systems, and more.

Figure 3:
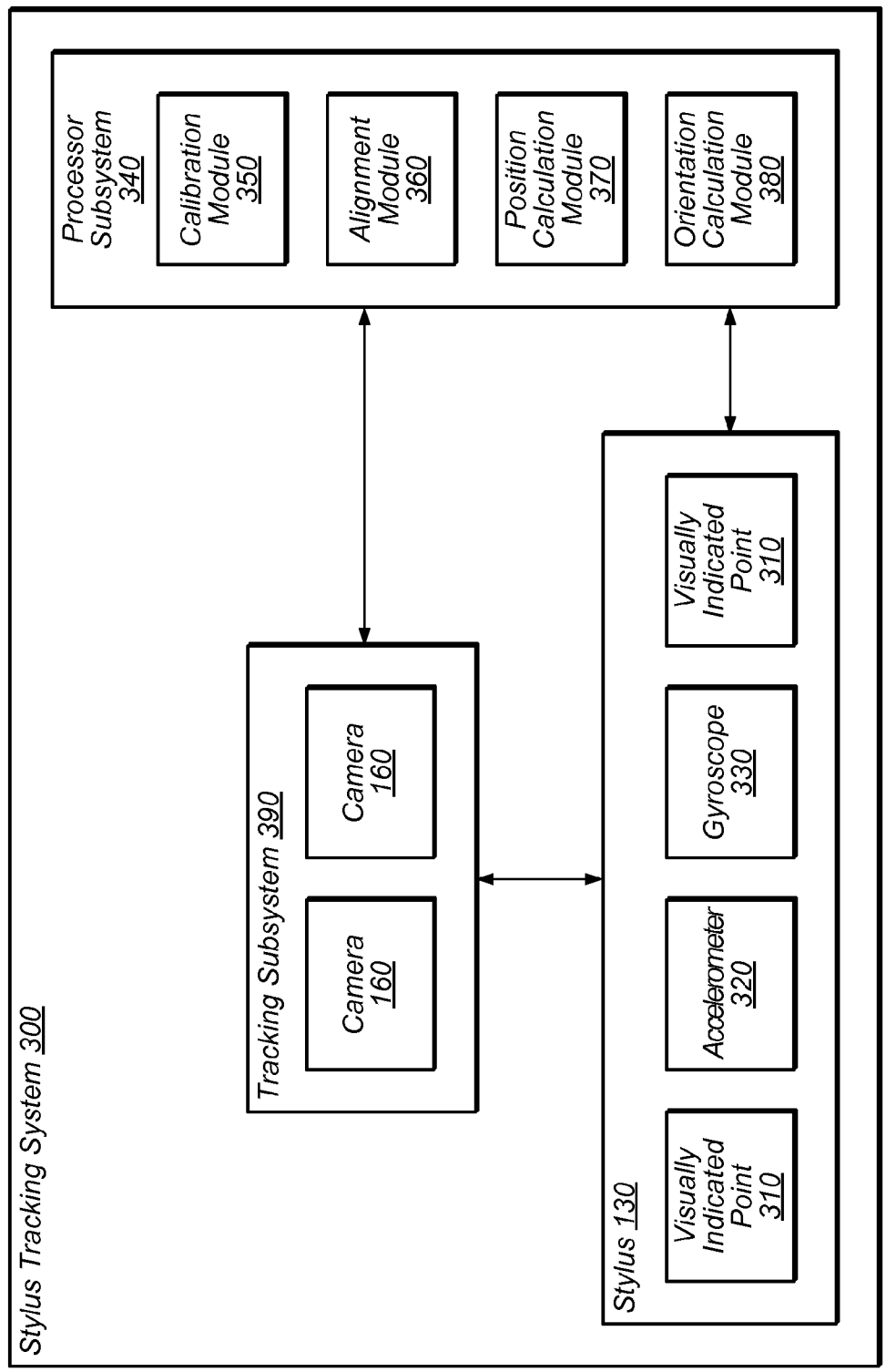
FIG. 3 is a block diagram illustrating one embodiment of the stylus tracking system.
Figures 4, 5:
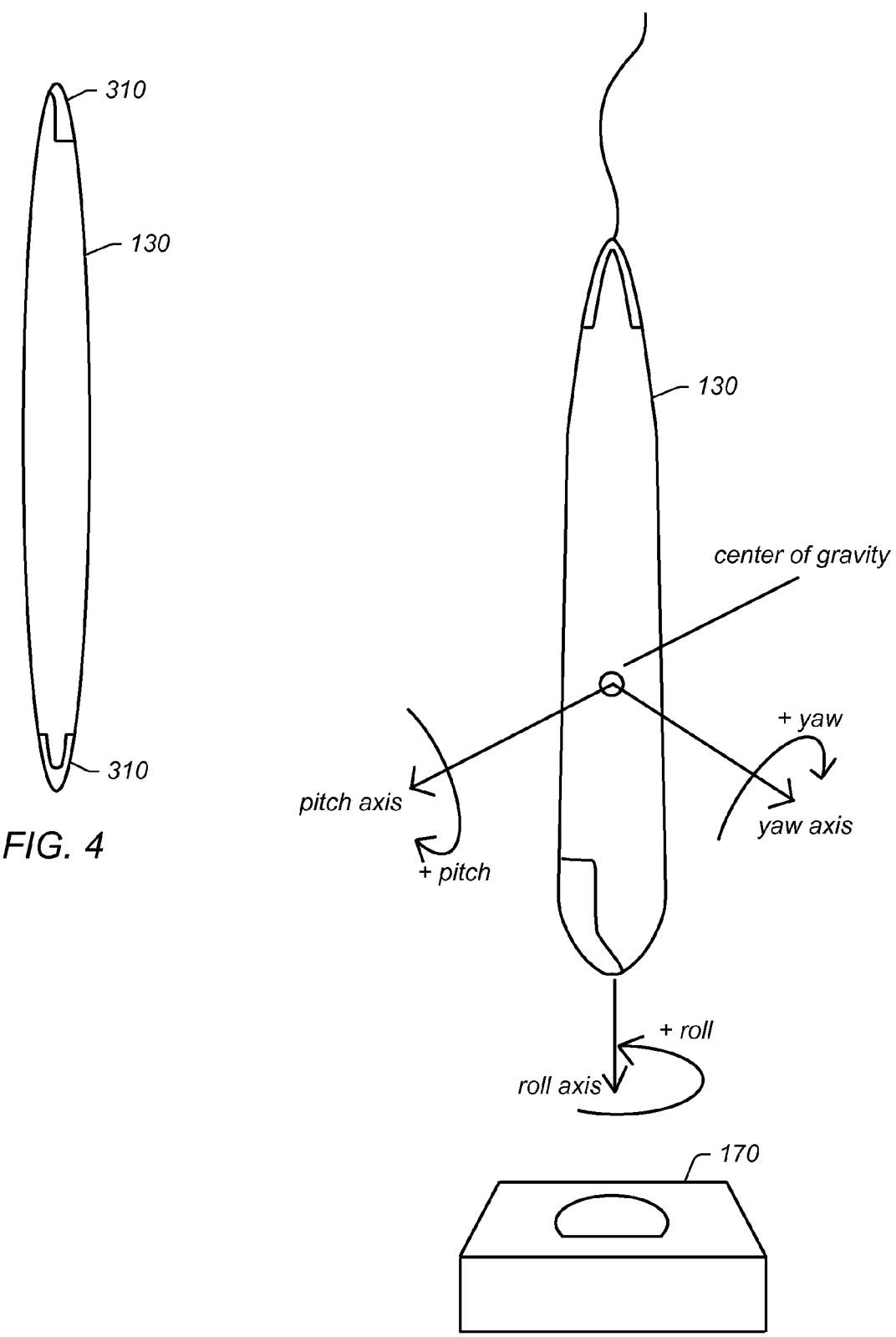
FIGS. 4 and 5 are an illustration of a stylus, according to various embodiments.

FIGS. 3-5—Stylus Tracking System

FIG. 3 is a block diagram illustrating one embodiment of the stylus tracking system. In the illustrated embodiment, stylus tracking system 300 includes user control device (e.g., stylus) 130, tracking subsystem 390, and processor subsystem 340. Stylus 130 may include one or more visually indicated points (e.g., light sources) 310 that are physically located on the stylus 130, e.g., that are located on the housing of the stylus 130 (see FIG. 4). As shown in FIG. 3, in one embodiment, stylus 130 includes one or more (e.g., shown in FIG. 3 as two) light sources 310. Stylus 130 may also include a constant direction determination mechanism, shown as accelerometer 320, and a field independent change-in-orientation mechanism, shown as gyroscope 330. Each of the accelerometer 320 and gyroscope 330 may be comprised within the housing of the stylus 130. Other constant direction determination mechanisms and field independent change-in-orientation mechanisms may be used in other embodiments. For example, the constant direction determination mechanism may be a constant gravity determination mechanism. In addition to or instead, a GPS device may employ either mechanism. For ease of explanation, however, these mechanisms are described in terms of accelerometer 320 and gyroscope 330. Tracking subsystem 390 may include at least one tracking sensors (e.g., shown as 2 cameras) 160 that are configured to capture and track perspectives of the visually indicated point(s) 310. Processor subsystem 340 may receive information from both tracking subsystem 390 and stylus 130 to calculate a position and orientation of stylus 130.

In one embodiment, tracking subsystem 390 includes two cameras 160. Cameras 160 may be placed to view the volume of interest, i.e., the region that at least encompasses where a user might view and interact with the stereo imagery. Cameras 160 may also be placed far enough apart from each other to provide enough separation of view for true three-axis triangulation determination and to allow for clear views of a visually indicated point, such as light source 310, of stylus 130. For example, the cameras 160 may be placed at interocular distances or other distances as desired. Cameras 160 may be positioned relative to a predefined position and orientation of the display. Using two cameras 160 may allow three-axis spatial positioning accuracy, even when stylus 130 includes using only one light source 310. In one embodiment, each camera 160 has a CMOS, or CCD, 320×240 pixel sensor with pixel pitch of 6 µm in each the x and y direction. Camera 160 may be fitted with a lens with a focal length of 1.4 mm and a field of view of 100 degrees. Such an implementation may allow movement in light source 310 position to be resolved to less than 1 mm in each of the x, y, and z directions. Orientation may likewise be resolved to less than 1 degree in each of roll, pitch, and yaw. This mm scale spatial resolution may be mapped to the computer graphic space as described below.

Tracking subsystem 390 may include more than two cameras 160. Adding more cameras 160 may reduce possible blind spots and allow for a third or more triangulation measuring of light source 310, which may add additional precision to the positioning information.

Stylus 130 may be in a pen grip form factor, which may allow for simple controlled manipulation of x, y, z, roll, pitch, and yaw. Stylus 130 may include one or more visually indicated points, such as light source 310. Light source 310 may be embedded in the exterior housing of stylus 130, and may be a light generating apparatus, such as an LED, and may be a small light point source to allow for higher precision of x, y, and z coordinate determination of stylus 130. In one embodiment, light source 310 may be within the infrared (IR) spectrum. In another embodiment, light source 310 may be a reflective light source, such as an embedded reflector reflecting an off-stylus primary light source.

In some embodiments, stylus 130 may include two non-adjacent light sources 310 with discernable spatial separation. This may ensure that when one light source 310 is occluded from the cameras 160, whether from orientation of stylus 130 or from or a user's hand or body, the other light source 310 may not be. Further, the two non-adjacent light sources 310 may have their own distinct one or more timing conditions to differentiate between the two light sources. In an embodiment where a light source 310 is on each end of stylus 130, providing distinct timing conditions may allow differentiation between the tip and end of stylus 130. Distinct timing conditions may include the light sources having different frequencies, different duty cycles, and/or a different timing offset from a central clock. For example, if cameras 160 are sensitive to a difference in frequencies, then it may be more likely that the two cameras 160 will both see at least one of the light sources 310. Even if each camera 160 only sees the light source 310 that the other camera 160 does not see, there still may be adequate information to allow processor subsystem 340 to update the x-y-z positioning information of stylus 130. As another example, a first light may be turned on while the second light remains off, then the second light may be turned on and the first light may be turned off. The turning off and on of the lights may be performed according to a known pattern and sequence. As such, the tip of the user control device may be distinguished from the end. Using distinct timing conditions may also allow two separate x, y, and z positions to be tracked for stylus 130. Thus the two cameras can identify two separate positions, each corresponding to a separate visually indicated point, which the system can allocate one to the tip and one to the end. As indicated above, this permits discerning both positioning and orientation information.

As noted above, processor subsystem 340 may receive information from both the tracking subsystem 390 (information from the two or more cameras 160 regarding the location and/or orientation of the stylus, or more particularly information regarding the locations of the light sources on the stylus 130) and information from the stylus 130 itself (e.g., information from the accelerometer 320 and/or gyroscope 330 on the stylus 130 itself) to calculate a position and orientation of stylus 130. In some embodiments, the information from the cameras 160 can be used to calculate an orientation that may be compared with readings from gyroscope 330 and/or accelerometer 320 to provide an extra layer of confidence to the orientation determination.

In one embodiment, user control device 130 may not include a magnetic sensor. As a result, magnetic field interference components (e.g., a metal watch) may not interfere with the tracking of user control device 130.

FIG. 4—Stylus Embodiment

Turning now to FIG. 4, one embodiment of stylus 130 is shown. The illustrated stylus 130 has a housing that comprises two visually indicated points, in the form of light sources 310, on opposite ends of stylus 130. In the embodiment shown, light sources 310 include distinct opaque portions such that each light source may produce a light field having the distinct opaque portion. The distinct opaque portions may assist in determining a rotational position of stylus 130. By dividing the rotational aspect of stylus 130 into segments, such as four quadrants for example, each stylus quadrant may have a distinct dual light field shape. The two cameras 160 may recognize both the position of the light field and which quadrant is seen, which may help determine an orientation of stylus 130. The orientation information of visually indicated point(s) 310 may be compared with information from gyroscope 330 and/or accelerometer 320 (and/or a magnetometer).

Referring back to FIG. 3, stylus 130 may also include an accelerometer 320 and gyroscope 330. Accelerometer 320 and gyroscope 330 may be located within the housing of the stylus 130. Each of accelerometer 320 and gyroscope 330 may be configured to provide additional information (e.g., measurements) to processor subsystem 340. Accelerometer 320 may be able to measure a known gravity referenced direction and provide the measurement to processor subsystem 340. Gyroscope 330 may be able to determine an orientation/rotation. This may include offset roll, pitch, and yaw measurements of stylus 130. Gyroscope 330 may take movement measurements and provide readings in real-time while the accelerometer readings may be averaged over time. An example gyroscope is the InvenSense ITG-3200 3-axis gyro or the InvenSense IMU-3000 3-axis gyro+digital motion processor (DMP). An example of the accelerometer is the Kionix KXTF9 3-axis accelerometer. In some embodiments, stylus 130 may include in a magnetometer instead of or in addition to gyroscope 330 and/or accelerometer 320. The magnetometer may also be configured to provide additional information to processor subsystem 340.

In one embodiment, processor subsystem 340 may receive information from both tracking subsystem 390 and stylus 130 to calculate a position and orientation (e.g., including rotation) of stylus 130. In the illustrated embodiment, processor subsystem 340 includes calibration module 350, alignment module 360, position calculation module 370, and orientation calculation module 380.

In one embodiment, calibration module 350 may calibrate cameras 160 using a reference target. The reference target may be moved to different pre-determined x, y, and z positions within the camera view space to allow the system to capture images from each camera 160 at each location and learn the correspondence between views and positions. The reference target may be a checkerboard target picture with dimensions of the checkerboard squares known by calibration module 350. By placing the checkerboard target picture at various pre-determined locations within the cameras' field of view, the system may correlate the captured images to three-dimensional positions. When a checkerboard target picture is used, sometimes one of the captured images may distort the squares as trapezoids instead of squares, e.g., when the target picture is positioned perpendicular to the respective calibrating camera. Calibration module 350 recognizes that the trapezoids should be squares and uses that information in its correlation process. Calibration module 350 may also factor the cameras' CMOS or CCD array density information and characteristics of the lenses in the calibration algorithm.

In one embodiment, calibration module 350 may calibrate the stylus 130 with reference to cameras 160. This may include determining a physical reference point at a fixed x, y, z position within the cameras' view, which is from a known positional distance from a predetermined point on the display, where the display orientation and position is known relative to the cameras orientations and positions. Stylus 130 may then be placed at the physical reference point. This may allow calibration module 350 to determine the relationship from stylus 130 to display.

Calibration module 350 may also calibrate a head tracking feature. Calibrating the head tracking camera, which may be the same cameras as cameras 160, includes placing a user's head at the physical reference point with the head in a known position and orientation with respect to the cameras. Calibrating the head tracking camera allows head tracking to be in synch with a known position of the display as described above.

Changes to the angle, orientation, or position of either cameras 160 or the display(s) may be tracked and programmed into calibration module 350. Or a calibration may be redone. For example, calibration module 350 may calibrate the stylus and/or camera(s) as a power on initialization or upon a certain event. Events may include placing stylus 130 in the caddy, user input directing recalibration, or a detected inconsistency between the captured at least one visually indicated point (e.g., camera information) and the additional information (e.g., measurements) from the gyroscope and/or accelerometer.

Alignment module 360 may be used to calibrate an initial angle, rotation, and orientation of stylus 130. In one embodiment, a known angle, rotation, and orientation reference may be used. For example, a caddy 170 or holder may be used. Caddy 170 may force stylus 130 to fit in a certain known manner (e.g., which may be stored in Alignment Module 360), including a tilt position with caddy 170 in a fixed position referenced to cameras 160. The caddy to camera fixed positioning may enable the roll, pitch, and yaw coordinate orientation to be the same as a known camera x, y, z orientation. Data from accelerometer 320 may be used by alignment module 360 to verify the expected roll position. Forcing the tilt may allow accelerometer 320, which is in a known position within the stylus, to convey to alignment module 360, a known gravity referenced direction. In this example, because alignment module 360 knows the structure of stylus 130, with embedded accelerometer 320, and the expected orientation due to gravity, the rotation of the stylus may be known and verified. Further, alignment module 360 may receive readings from gyroscope 330 as a baseline when stylus 130 is situated in caddy 170. Using the reading from accelerometer 320 and the known x, y, z positions, as discussed above, may allow the bias, noise, or error from the gyroscope 330 to be zeroed out.

In one embodiment, position calculation module 370 may receive positional information of light sources 310 from cameras 160. For example, the positional information may be in the form of raw or processed image files, metadata with the images, etc. Prior to receiving that information, it may be assumed that the following has been determined: the spatial volume, as viewable by cameras 160, the spatial correlation of cameras 160 aligned to one another, the shared coordinate space of the cameras to accelerometer 320 and gyroscope 330, and the point position of light source 310 in relation to stylus 130. When stylus 130 moves, cameras 160 see light sources 310 of stylus 130. The imaged area of light source 310, or visually indicated point, may be averaged to determine a center point, or tip point, of stylus 130. For example, if the imaged light source 310 has a diameter M and circumference N, the position calculation module 370 may determine the center of light source 310 and correlate that as the point source. Additionally, position calculation module 370 may know the expected shape of light sources 310 and, based on the images received from cameras 160 and angle of view, position calculation module 370 may provide a more accurately determined tip point of stylus 130. Position calculation module may then apply an algorithm or algorithms, such as perspective projection transformation, inverse perspective, or binocular stereo, to the information or properties from cameras 160. Such properties may include and take into account the CMOS and CCD array parameters (pitch), lens parameters, and the lens effect. The algorithm(s) may then determine the x, y, and z position of stylus 130. In one embodiment, position calculation module may calculate the x, y, and z position without using the additional information from accelerometer 320 and gyroscope 330.

Orientation calculation module 380 may calculate a roll, pitch, and yaw for stylus 130. In one embodiment, orientation calculation module 380 receives additional information (e.g., measurements) from gyroscope 330, which may provide real-time offset roll, pitch, and yaw information for the stylus 130. The offset roll, pitch, and yaw may then be compared, every few update cycles, with a measured reading, averaged over time, from accelerometer 320. The update cycles may be performed periodically at a known update frequency. In this way, accelerometer 320 may serve as a reference from which gyroscope 330 is periodically verified for correct roll, pitch, and yaw updating. In some embodiments, orientation module 380 may receive measurements from a magnetometer. For example, a magnetometer may provide a measurement that indicates the direction of magnetic north. Magnetic north may remain stationary as a function of time and may therefore be used to determine orientation of the user control device. Orientation of user control device 130 may then be calculated based on the captured images from tracking sensor(s) 160 and the additional information from accelerometer 320 and gyroscope 330 (and/or from a magnetometer).

Processor subsystem 340 may then provide an updated 3D scene to display(s) 150. The updated 3D scene may reflect an accuracy between the physical space of user control device 130 to the graphic space of the 3D scene to within 1 mm in each of the x, y, and z axes. The tracking system may be tied to the graphic system in that the tracking system may capture the stylus's physical x, y, z, pitch, yaw, and roll positional information as well as the change of position of the stylus to sub mm and sub degree accuracy. The graphic space may be defined as having vector graphics of unit length, width, depth, position and orientation in graphic units. The user may assign the graphic units to a physical world equivalence (e.g. μm, mm, inches, feet, etc.). When the tracking system communicates with the graphic system, a units designation may exist along with the units (e.g. designation of inches with a value of 4). The tracking system may provide its position information to the graphic space and the graphic space may interpret the units designation. As a result, the graphic space may correlate the position information from the tracking system to its equivalence in the graphic space. More accurate tracking system information relative to the actual position of the stylus may result in a more accurate correlation of that information to the interpreted graphic space.

FIG. 5 illustrates one embodiment of stylus 130. As shown in FIG. 5, stylus 130 has a center of gravity, about which the roll, pitch, and yaw axes are shown. Also shown is caddy 170 where stylus 130 may be stored. As discussed above, caddy 170 may also be used to calibrate and align stylus 130. When stylus 130 is in a known configuration, for example, when stored in caddy 170, the roll, pitch, and yaw of stylus 130 may be zeroed out or set to some other known values.

The stylus tracking system described herein may be useful in situations that require precise movement tracking, in both slow and fast motion, of wrist, hand, or finger manipulation of a stylus. Such movement tracking may be useful for fine computer user input activities in a volume space of a stereoscopic display environment. Because accelerometers and gyroscopes inherently drift, the system described herein, which uses cameras 160 as an additional tracking information source, may be useful because the camera measurements may be used to cross reference with the accelerometer/gyroscope additional information (e.g., measurements) to update the drifted accelerometer 320 and gyroscope 330. More generally, the system may operate to cross reference/compare the various measurements of the accelerometer 320, gyroscope 330, and/or cameras 160 to perform more precise tracking of the position/orientation of the stylus 130.

Further, the positioning of the cameras in the stylus tracking system may associate the position and orientation of the display screen in a manner that allows precision inputs to the graphics engine for interaction with stereo rendered display objects. In other words, cameras 160 may be positioned relative to a predefined position and orientation of the display.

The tracking system described above may also be used, in some embodiments to track a head or user, in addition to, or instead of, stylus 130.

Figure 6:
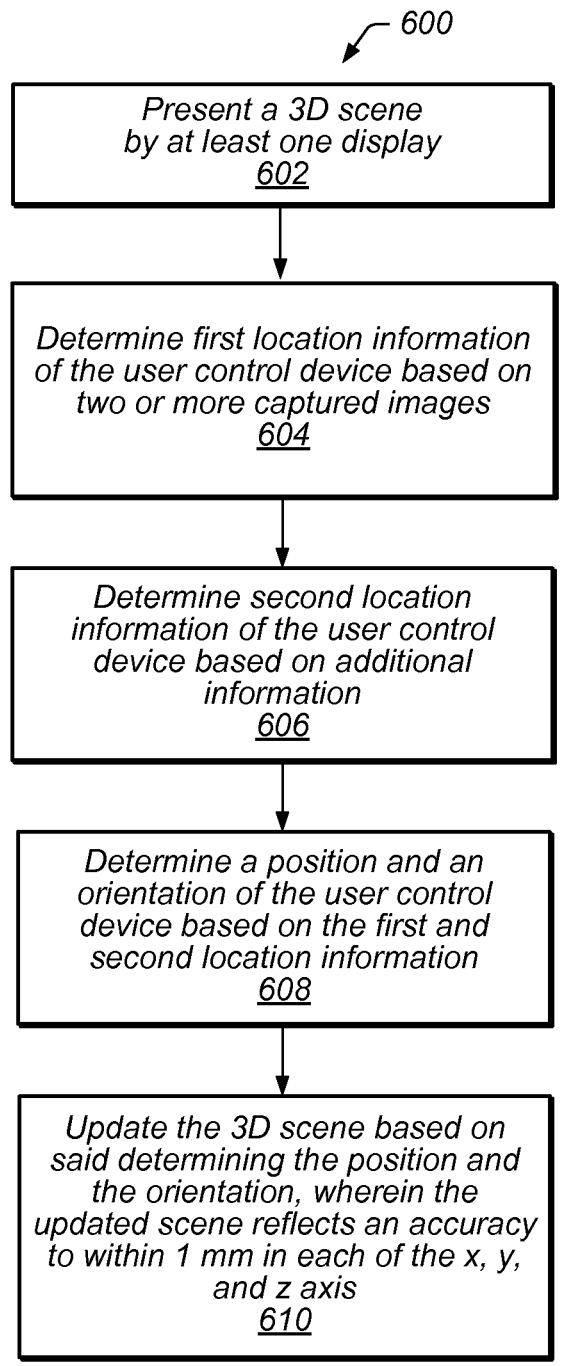
FIG. 6 is a flowchart diagram illustrating one embodiment of a method for tracking three-dimensional coordinates of a stylus.

FIG. 6—Presenting a 3D Representation of a Stylus Within a 3D Scene

FIG. 6 illustrates a method 600 for determining 3D coordinates of a user control device (e.g., a stylus) and updating a 3D scene based on the coordinate determination. The method shown in FIG. 6 may be used in conjunction with any of the computer systems or devices shown in the above figures, among other devices. In various embodiments, some of the method elements shown may be performed concurrently, in a different order than shown, or may be omitted. In some embodiments, method 600 may include additional (or fewer) steps than shown. As shown, method 600 may operate as follows.

As illustrated at 602, a 3D scene may be presented by at least one display (e.g., the display(s) 150). More particularly, one or more stereoscopic images of the 3D scene may be presented by the display(s). The 3D scene may be presented according to a first viewpoint. For example, the first viewpoint may be based on an eyepoint of a user viewing the 3D scene. In one embodiment, the method may include determining the first viewpoint, e.g., by determining the eyepoint of the user viewing the 3D scene. The method may determine the eyepoint of the user using various techniques, such as a position input device (e.g., eyewear which may be used to provide eyepoint position information), triangulation, head/eye tracking, etc. Accordingly, the 3D scene may be rendered such that the user can view the 3D scene with minimal distortions (e.g., since it is based on the eyepoint of the user). More specifically, when the 3D scene is based on the user's eyepoint, the 3D scene is rendered based on the perspective as would be seen by the viewer. This rendering avoids much of the distortion that would be conveyed if the viewpoint of the scene did not match the eyepoint of the viewer. In other words, a displayed object retains the correct perspective as well as the correct offset positioning and orientation from the display device as perceived by the viewer as long as the viewer eyepoint and 3D scene viewpoint remain in correspondence.

As indicated above, the 3D scene may be presented by a single display or a plurality of displays. In one embodiment, the 3D scene may be presented by a vertical display and an off-axis display, such as a horizontal display. For example, the vertical display may present a first stereoscopic image, e.g., according to a vertical perspective, and the horizontal display may present a second stereoscopic image, e.g., according to a horizontal perspective. These two stereoscopic images may form or convey the 3D scene to the user. In further embodiments, the two displays may be joined by a curvilinear or blending display, which may also present a stereoscopic image. The stereoscopic image of the blending display may operate to blend the stereoscopic images of the vertical and horizontal displays. Other numbers and types of displays are contemplated for presenting the 3D scene.

At least a portion of the 3D scene may be presented in "open space" above, in front of or otherwise outside of the at least one display. Thus, at least a portion of the 3D scene may appear as a hologram above the display surface. For example, when a horizontal display is used to render a stereo image (or video) pair, the 3D scene may be seen as hovering above the horizontal display. It should be noted however, that a portion of the 3D scene may also be presented as appearing behind the display surface, which is not in "open space". Thus, "open space" refers to a space which the user is able to freely move and interact (e.g., where the user is able to place his hands in the space or manipulate user control device 130) rather than a space the user cannot freely move nor interact (e.g., where the user is not able to place his hands in the space, such as below the display surface). This "open space" may be referred to as a "hands-on volume", as opposed to an "inner-volume" which may be under the surface of the display(s). Thus, the user can directly interact with objects (displayed virtual objects), for example with user control device 130, in the open space because they co-inhabit the physical space proximate to the user. The inner volume is located behind the viewing surface, and portions of the 3D scene within this inner volume appear "inside" the physical viewing device. Thus, objects of the 3D scene presented within the inner volume do not share the same physical space with the user, and the objects therefore cannot be directly, physically manipulated by hands or handheld tools. That is, objects displayed within the inner volume may be manipulated indirectly, e.g., via a computer mouse, a joystick, or a virtual stylus (e.g., including a virtual extension to a stylus).

As shown at 604 and 606, first and second location information of a user control device (e.g., stylus 130) may be determined. In various embodiments, location information may refer to position and/or orientation. First location information may be determined based on two or more captured images of a visually indicated point of the stylus. For example, the two or more captured images may come from two spatially separated cameras. As a result, each of the two or more captured images may be captured from a distinct perspective. The visually indicated point on stylus 130 may be a center point or edge of light source 310 or it may be the light source 310 itself. A center point may be determined by averaging light source 310. For example, if the image portion of light source 310 is a diameter M and circumference N, processor subsystem 340 may determine a center of light source 310 and correlate that as the point of stylus 130. The point of stylus 130 may be a tip of stylus 130.

In one embodiment, stylus 130 may include a second visually indicated point, such that the first and second visually indicated points are non-adjacent. The second visually indicated point may be the center point or edge of a second light source 310. In such an embodiment, location information of the second visually indicated point on stylus 130 may be determined as well. As an example, first location information may include separate location information, with each separate set of location information corresponding to one of the visually indicated points. The separate location information for each of the visually indicated points may be based on one or more captured images from each of the cameras. In a simple example with two cameras and two visually indicated points, location information may be determined for the first visually indicated point based on two captured images, one from each camera. Likewise, location information may be determined for the second visually indicated point based on two captured images, one from each camera. The captured image from a given camera may be used to determine location image for each visually indicated point. For instance, an image may capture both visually indicated points and may be used to determine respective location information corresponding to each of the visually indicated points. Continuing the example, the separate location information may be determined for both visually indicated points using the same two captured images (one from each camera). Based on the separate location information for each visually indicated point, the first location information may be determined such that it includes or reflects the separate location information corresponding to each visually indicated point.

Prior to, during, or after blocks 604 and 606, a user may pick up the stylus and interact with a portion of the 3-D scene, e.g., by positioning the stylus to specify a displayed object (e.g., by selecting a space that correlates to a displayed object), specifying a space within the 3-D scene, etc. In 604, the method may determine first location information of at least one visually indicated point of the stylus, wherein the determining is performed utilizing at one tracking sensor. In one embodiment, the first location information may be obtained using at least two tracking sensors (e.g., spatially separated cameras). In other embodiments, the first location information may be obtained from a single tracking sensor.

Thus, at block 604, in embodiments where the system includes a first and second camera, first location information of the same visually indicated point on stylus 130 may be determined based on images from each camera. In an embodiment where stylus 130 includes a second visually indicated point, first location information may include location information corresponding to the second visually indicated point on stylus 130 and may be based on the same or different images from each camera.

In various embodiments, the first and second visually indicated points may be configured to emit light having first and second timing conditions, respectively, with the first and second timing conditions (e.g., frequencies of light) being different. For instance, the two different frequencies may be different frequencies within the IR spectrum. Determining first location information may then include identifying which captured images correspond to which visually indicated point.

In some embodiments, the first and second visually indicated points may include opaque portions. For example, a light source of the first visually indicated point may be configured to produce a light field having an opaque portion having one shape and the second visually indicated point may be configured to produce a light field having an opaque portion having another shape such that when light is emitted or reflected from the visually indicated points, the quadrants of the user control device may be distinguishable. Accordingly, determining the first location information may include identifying quadrants of the user control device based on the presence of the opaque portions in the captured images.

The first location information may be determined from the one or more cameras using any of various techniques. For example, a camera may capture an image of the scene including the visually indicated point on the stylus 130, and provide the image to processor subsystem 340. The camera may pre-process the images using image processing software. The image may be analyzed by processor subsystem 340 to determine the pixel location within the scene where the visually indicated point is located. This pixel location may then be used to determine location of the respective visually indicated point within the actual scene. In embodiments in which multiple images are captured, each camera may be configured to capture a distinct perspective of the at least one visually indicated point.

As illustrated at 606, the method may also determine second location information (e.g., measurements) from each of the one or more position determining devices within the stylus. This may include a gyroscope, accelerometer, magnetometer, etc.

The first and second location information that is determined in 604 and 606 may include x, y, and z coordinates as well as roll, pitch, and yaw values. This data may be provided to processor subsystem 340 based on information provided by camera(s) 160, gyroscope 330, and accelerometer 320.

As shown at 608, processor subsystem 340 may determine or resolve a position and an orientation of user control device 130 based on the first and second location information of the visually indicated point on stylus 130. Stated another way, the processor subsystem 340 may determine or resolve a location of stylus 130 based on information from the two or more cameras 160, the gyroscope 330, and accelerometer 320, among other possibilities. In embodiments using additional visually indicated points, processor subsystem 340 may use the additional visually indicated points' location information to further refine a location of stylus 130. In some embodiments, system 100 may include more than two cameras. When system 100 includes more than two cameras 160, processor subsystem 340 uses the information from the multiple cameras to further refine a location of stylus 130. Processor subsystem 340 may resolve the positioning of stylus 130 as a function of the lens, pixel sensor, and/or array size (pitch) of cameras 160.

As stylus 130 is moved, cameras 160 may provide location information based on a location of light source 310. As discussed above, the imaged portion of light source 310 may be processed by processor subsystem 340 to correlate the light source 310 into a point of stylus 130, such as the tip. In at least some embodiments, as the stylus 130 is moved, information from each of the two or more cameras 160, the gyroscope 330, and accelerometer 320 is used collectively to track the movement of the stylus 130.

Various methods may be used to determine the location/orientation of the stylus 130 based on the information from the two or more cameras 160, the gyroscope 330, and accelerometer 320. One example method is a Kalman Filter that combines the different measurements to obtain an estimate of a system position state. As another example, if the gyroscope 330 indicates the stylus 130 is at position A, the accelerometer 320 indicates (e.g., indirectly) position B, and the 2 video cameras 160 indicate position C, the position estimate may be formulated based on a combination of this information. For example, in the case of discrepancies/inconsistencies, the various positions may be averaged. Such averaging may include weighting information that comes from a more reliable device (e.g., presume the gyroscope is more precise than the accelerometer) greater in the calculation than the others. In other embodiments, other ways to resolve inconsistencies between the first and second location information, such as ignoring a portion of the first and/or second information, may used.

At 610, the 3D scene may be updated based on the user control device position and orientation determination at 608. Updating the 3D scene may include updating a location of a virtual object within the scene based on manipulation by stylus 130, a user's hands, or some other handheld device. Updating the 3D scene may also include rendering a virtual representation of stylus 130 within the graphic space corresponding to the position, rotation and orientation of the tracked stylus. The incremental positioning of stylus 130 in each of the six axes may be accurately tracked for precise correlation between the registered positioning of the physical stylus 130 and the rendering of the virtual stylus in the stereo display space. The rendering, or virtual stylus, may include a virtual graphic position and orientation. For example, stylus 130 light source 310 positioning may be resolved to less than 1 mm in each of the x, y, and z axis. This mm scale spatial resolution may be mapped to the computer graphic space. Accordingly, the updated 3D scene may reflect an accuracy between the physical space of the user control device to the graphic space of the 3D scene to within 1 mm in each of the x, y, and z axes. A virtual stylus graphic, which may be part of the computer graphic model, may be rendered on the stereo display as any other graphic object. The virtual stylus graphic on the stereo display may appear coincident with the physical stylus 130.

Method 600 may allow a system to precisely track a user's wrist, hand, and finger manipulation of stylus 130. This method may allow for detection of both slow and fast motion. Further, the use of multiple cameras may refine the stylus location and cross-reference gyroscope 330 and accelerometer 320 orientation readings. By tracking a precise location of stylus 130, a user may be able to finely manipulate a virtual object in a graphic space. In some embodiments, the physical stylus 130 manipulates a virtual object. In other embodiments, a virtual stylus, represented in the 3D space by the location and orientation determined by method 600, may manipulate a virtual object.

Exemplary Illustrations

Figure 7A:
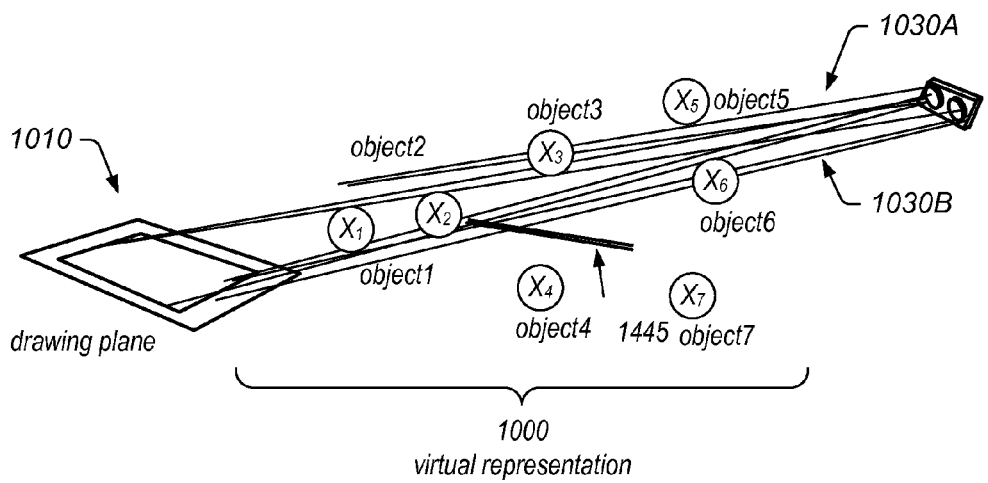
FIGS. 7A-7B are exemplary illustrations of the described embodiments.
Figure 7B:
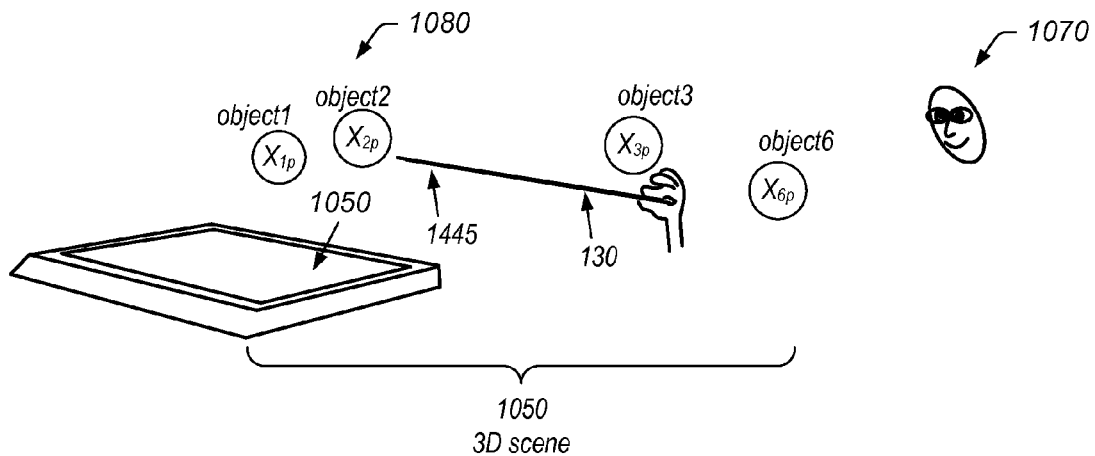

FIGS. 7A and 7B illustrate an exemplary mapping of graphic space to display space. For example, FIG. 7A illustrates the virtual representation 1000 with an interactive element 1445, which may act as an extension to stylus 130 (shown in FIG. 7B), and FIG. 7B illustrates the presentation of the 3D scene 1050 corresponding to the virtual representation 1000 of FIG. 7A (using the display 150B).

In the embodiment shown, the physical stylus 130 may be extended in the 3D scene 1050 via the projected, virtual stylus 1445. Thus, the stylus 130 may have a virtual, displayed extension 1445 which begins from the end of the physical stylus 130.

The hand held tool may be any tracked device, e.g., in terms of position and orientation, and may be tracked according to the embodiments discussed above. For example, as described above, two cameras 160 (not shown in these Figures) may track a location of stylus 130. The stylus 130 may be of a variety of shapes and it may or may not have the virtual stylus 1445, as an extension or otherwise. Additionally, instead of acting as an extension, the virtual stylus 1445 may move according to corresponding movements of the stylus 130, but may not appear to be connected at all. For example, virtual stylus 1445 may be rendered to be stereoscopically viewed in a location proximate to stylus 130. In the embodiment shown, virtual stylus 1445 appears as an extension to the stylus 130, e.g., via stereoscopic images provided to the eyepoint 1070.

As the user moves the stylus 130, certain corresponding actions may occur. In one embodiment, the corresponding virtual stylus 1445 may be repositioned both in the virtual representation and the 3D scene. In another embodiment, the virtual stylus 1445 may not be rendered and hence may not be imaged nor seen by the user, but one of the objects, such as object 2, may allow the user to have feedback of where the stylus 130 is positioned and oriented. The imaged distance between the far tip of the stylus 130 or the virtual stylus 1445 and the user perceived imaged object 2 can be set based on different parameters, such as user or design preferences. In some embodiments, changes in location of stylus 130 may be resolved to 1 cm and in some embodiments to less than 1 mm in each of the x, y, and z axes as well as nominally 5 degrees and, in some embodiments, to less than 1 degree in each of the pitch, yaw and roll axes.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. A system, comprising:
a display configured to display a stereoscopic three-dimensional (3D) scene within a virtual space;
a user control device configured to manipulate objects within the stereoscopic 3D scene, wherein the user control device includes one or more position or orientation sensors, and at least one visually detectable point;
at least one tracking sensor configured to track the at least one visually detectable point in a physical space; and
a processing subsystem configured to:
provide the stereoscopic 3D scene to the display;
receive first location information for the at least one visually detectable point from the at least one tracking sensor;
receive second location information from the one or more position or orientation sensors of the user control device;
determine a position and an orientation of the user control device based on the first and second location information; and
provide an updated stereoscopic 3D scene to the display based on the determined position and orientation of the user control device in the physical space, wherein the updated 3D stereoscopic scene in the virtual space correlates to the physical space.

2. The system of claim 1, wherein the at least one visually detectable point includes first and second visually detectable points, wherein the first and second visually detectable points are non-adjacent, and wherein the first visually detectable point is configured to emit light having a first timing condition, and wherein the second visually detectable point is configured to emit light having a second timing condition.

3. The system of claim 1, wherein the at least one visually detectable point includes first and second visually detectable points, wherein the first visually detectable point is configured to produce a first light field having a first opaque portion, wherein the second visually detectable point is configured to produce a second light field having a second opaque portion different than the first opaque portion.

4. The system of claim 1, wherein the one or more position or orientation sensors of the user control device comprise a field independent change-in-orientation mechanism and a constant direction determination mechanism, and wherein the second location information comprises information from the field independent change in orientation mechanism and the constant direction determination mechanism.

5. The system of claim 4, wherein the constant direction determination mechanism is a constant gravity determination mechanism.

6. The system of claim 4, wherein the field independent change-in-orientation mechanism and the constant direction determination mechanism are implemented with a gyroscope and an accelerometer, respectively.

7. The system of claim 1, wherein to perform said determining the position and the orientation of the user control device, the processing subsystem is further configured to determine a center of the at least one visually detectable point.

8. The system of claim 1, wherein the processing subsystem is further configured to compensate for a drift or bias of a measurement device of the user control device based on an inconsistency between the tracked at least one visually detectable point and the second location information.

9. The system of claim 1, wherein the processing subsystem is further configured to resolve an inconsistency between the tracked at least one visually detectable point and the second location information.

10. The system of claim 1, wherein to provide an updated 3D scene, the processor subsystem is further configured to render a virtual representation of the user control device, wherein the virtual representation of the user control device reflects a correspondence to the user control device's position and orientation in the physical space relative to that of the graphic space.

11. The system of claim 1, wherein the at least one tracking sensor includes first and second cameras, wherein each of the first and second cameras is configured to capture a distinct perspective of the at least one visually detectable point.

12. The system of claim 11, wherein the first and second cameras are separated far enough from each other to enable three-axis triangulation determination, and wherein the first and second cameras are positioned relative to a predefined position and orientation of the display.

13. The system of claim 1, wherein the one or more position or orientation sensors of the user control device comprise a magnetometer, and wherein the second location information comprises information from the magnetometer.

14. A method, comprising:
presenting a stereoscopic three-dimensional (3D) scene within a virtual space by at least one display, wherein said presenting the stereoscopic 3D scene comprises displaying at least one stereoscopic image of the stereoscopic 3D scene by the at least one display, wherein a user control device is used to manipulate objects within the stereoscopic 3D scene, and wherein the user control device includes one or more position or orientation sensors, and at least one visually detectable point;
receiving first location information for the at least one visually detectable point from at least one tracking sensor configured to track the at least one visually detectable point in a physical space;
determining second location information of the user control device based on the one or more position or orientation sensors of the user control device;
determining a position and an orientation of the user control device based on the first and second location information; and
updating the stereoscopic 3D scene based on said determining the position and orientation of the user control device in the physical space, wherein the updated stereoscopic 3D scene in the virtual space correlates to the physical space.

15. The method of claim 14, wherein said determining the position and orientation of the user control device includes resolving an inconsistency between the first and second location information.

16. The method of claim 14, wherein the at least one visually detectable point includes non-adjacent first and second visually detectable points of the user control device.

17. The method of claim 16, wherein the received first location information of the user control device includes information regarding each of the first and second visually detectable points, wherein the first location information includes respective location information corresponding to the first and second visually detectable points based on captured images of the first and second visually detectable points from each of at least two distinct perspectives.

18. The method of claim 17, wherein the first and second visually detectable points are configured to emit light having a first and a second timing condition, respectively, wherein the first and second timing conditions are different, wherein said determining the first location information includes identifying which captured images correspond to which visually detectable point.

19. The method of claim 17, wherein a light field of the first visually detectable point includes a first opaque portion, wherein a light field of the second visually detectable point includes a second opaque portion that is a different shape than the first opaque portion, wherein said determining the first location information includes identifying quadrants of the user control device based on a presence of the first and second opaque portions in the captured images.

20. A non-transitory computer accessible memory medium storing program instructions, wherein the program instructions are executable by a processor to perform:
providing a stereoscopic 3D scene for display within a virtual space by at least one display, wherein said providing the stereoscopic 3D scene comprises providing at least one stereoscopic image of the stereoscopic 3D scene to the at least one display, wherein a user control device is used to manipulate objects within the stereoscopic 3D scene, and wherein the user control device includes one or more position or orientation sensors, and at least one visually detectable point;
receiving first location information for the at least one visually detectable point from at least one tracking sensor configured to track the at least one visually detectable point in a physical space;
determining second location information of the user control device based on one or more position or orientation sensors of the user control device;
determining a position and an orientation of the user control device based on the first and second location information; and
updating the stereoscopic 3D scene based on said determining the position and orientation of the user control device in the physical space, wherein the updated stereoscopic 3D scene in the virtual space correlates to the physical space.

* * * * *